United States Patent [19]

Foust et al.

[11] Patent Number: 4,512,701
[45] Date of Patent: Apr. 23, 1985

[54] PALLET HEIGHT SENSING MECHANISM

[75] Inventors: Julian D. Foust; Leonard M. Ysidro, Sr., both of Cleveland; Danny R. Cross, Decatur, all of Tenn.

[73] Assignee: Olin Corporation, Cheshire, Conn.

[21] Appl. No.: 452,261

[22] Filed: Dec. 22, 1982

[51] Int. Cl.³ ............................................. B65G 43/08
[52] U.S. Cl. .................... 414/101; 209/604; 414/110
[58] Field of Search .............. 209/600, 601, 603, 604; 414/68, 84, 76, 101, 110; 198/502

[56] References Cited

U.S. PATENT DOCUMENTS

| | | | |
|---|---|---|---|
| 2,467,203 | 4/1949 | Gelbman | 25/1 |
| 2,633,251 | 3/1953 | Bruce | 214/6 |
| 2,699,264 | 1/1955 | Bruce | 214/6 |
| 2,949,179 | 8/1960 | Busse | 198/30 |
| 2,979,872 | 4/1961 | Verrinder | 414/110 X |
| 3,404,788 | 10/1968 | Thomas et al. | 214/6 |
| 3,522,890 | 8/1970 | Birchall | 214/6 |
| 3,682,290 | 8/1972 | Von Gal, Jr. et al. | 198/21 |
| 3,682,338 | 8/1972 | Von Gal, Jr. et al. | 214/8.5 D |
| 3,693,321 | 9/1972 | Nilsson | 53/244 |
| 3,710,532 | 1/1973 | Smilek et al. | 53/26 |
| 3,767,342 | 10/1973 | Potter et al. | 425/157 |
| 4,271,755 | 6/1981 | Kintgen et al. | 414/68 X |
| 4,307,807 | 12/1981 | Oswald et al. | 209/604 X |

FOREIGN PATENT DOCUMENTS

| | | | |
|---|---|---|---|
| 1244056 | 7/1967 | Fed. Rep. of Germany | 414/43 |
| 2410775 | 9/1975 | Fed. Rep. of Germany | 209/604 |

*Primary Examiner*—Robert J. Spar
*Assistant Examiner*—Janice Krizek
*Attorney, Agent, or Firm*—Ralph D'Alessandro; Donald F. Clements; Thomas P. O'Day

[57] ABSTRACT

Automatic height sensing mechanism is provided to sense the height of an individual pallet or slip sheeted pallet and automatically adjusts the stripper plate above the sensed height as the pallet is moved along a predetermined path of travel by a conveyor.

17 Claims, 6 Drawing Figures

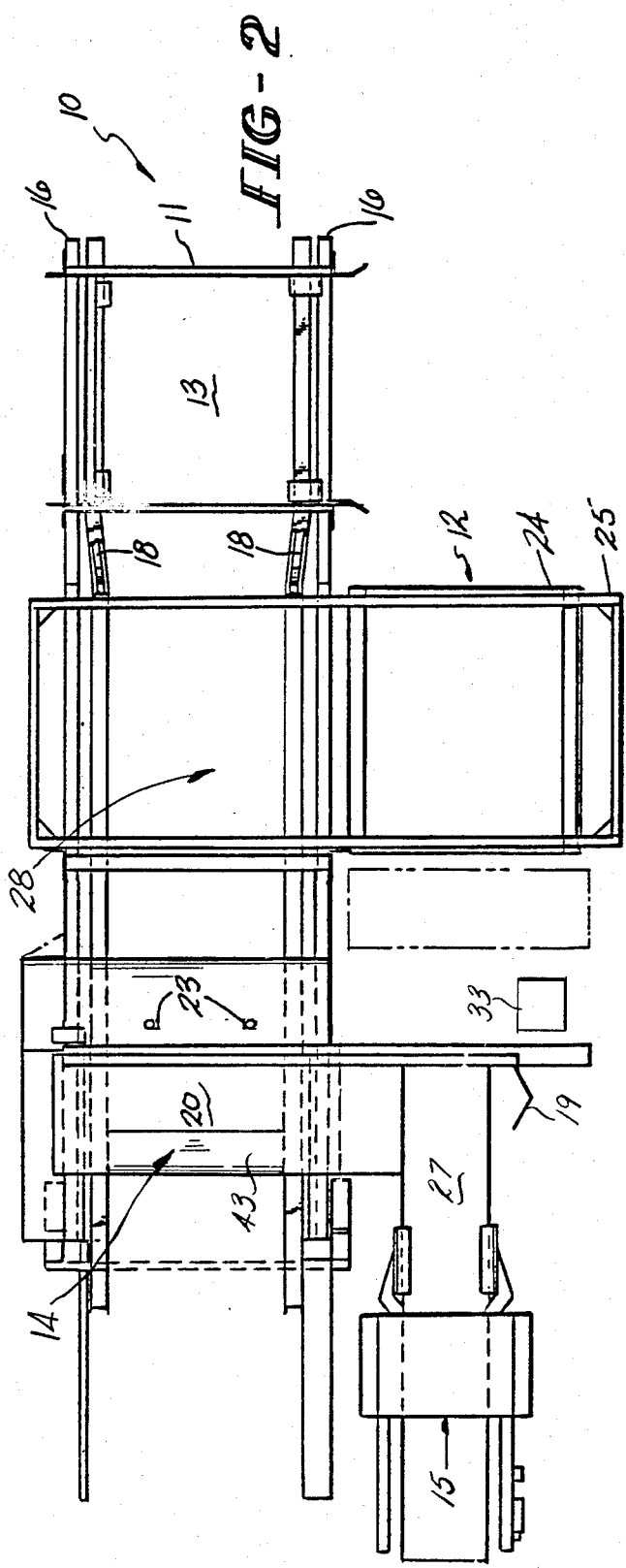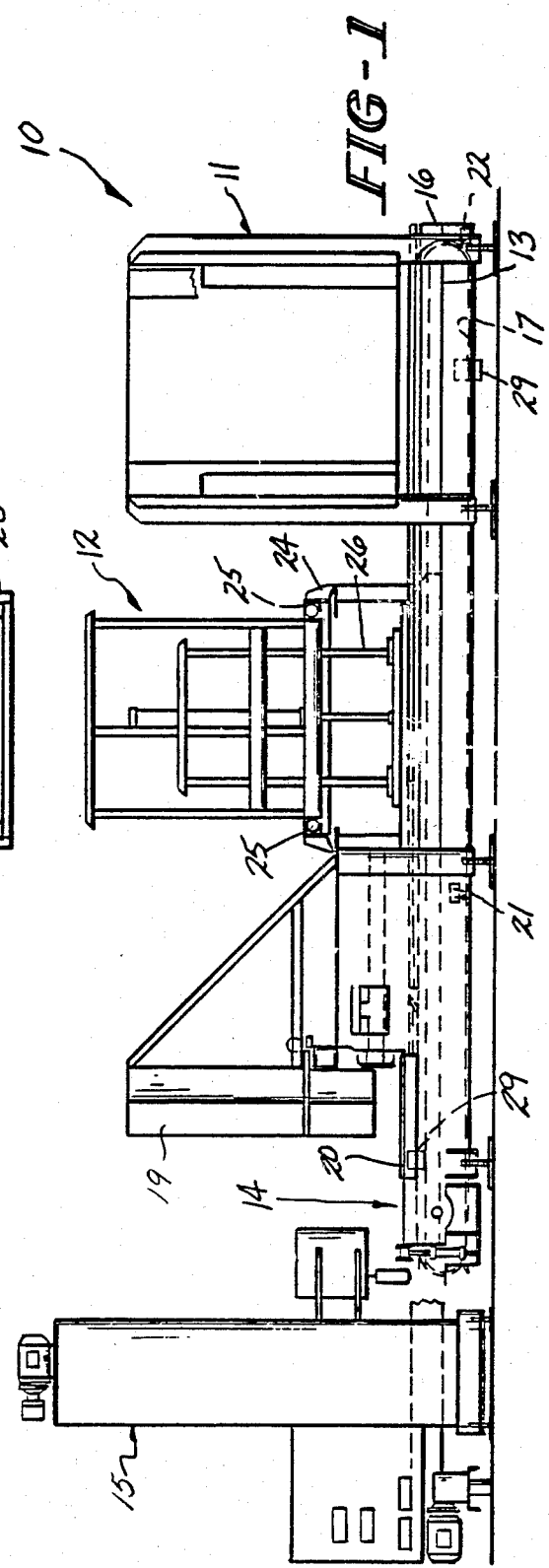

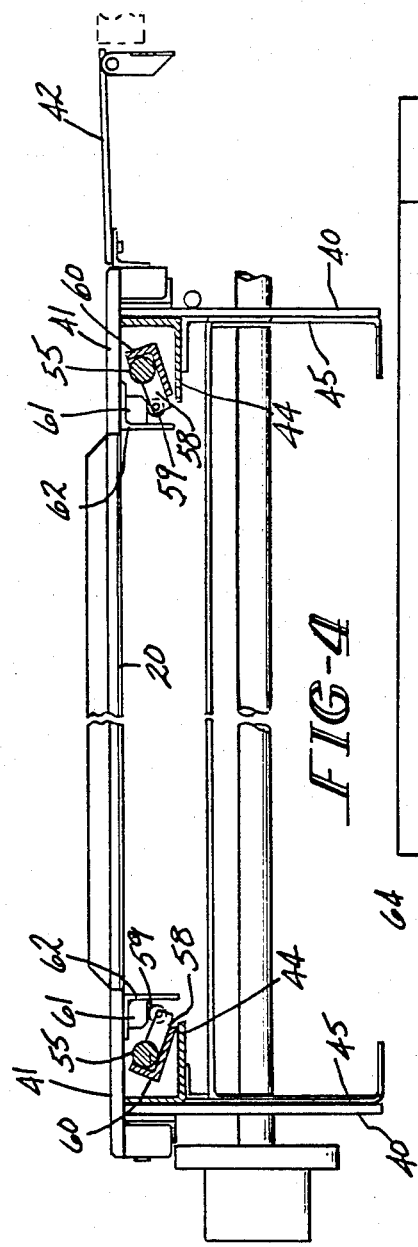
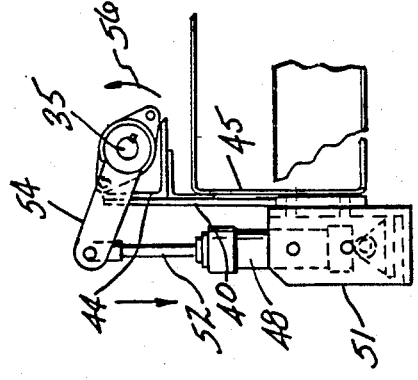
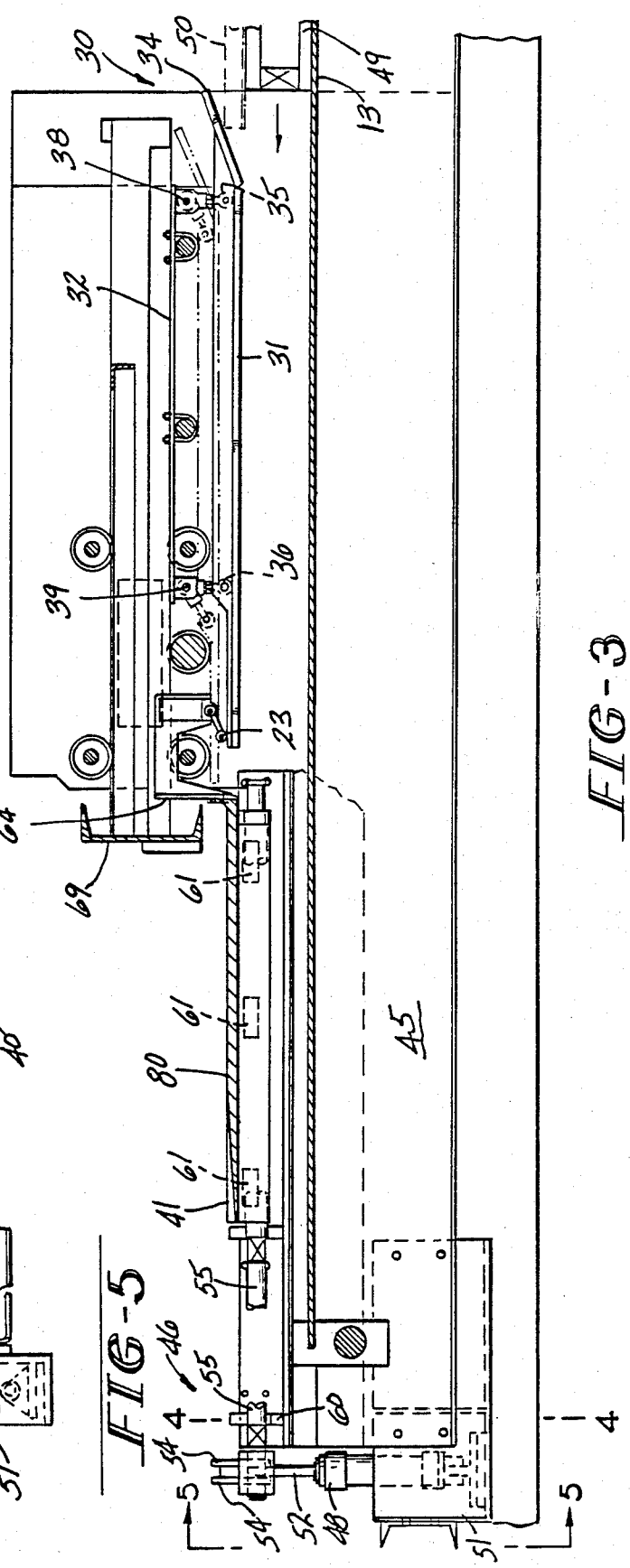

PALLET HEIGHT SENSING MECHANISM

BACKGROUND OF THE INVENTION

This invention relates generally to automatic palletizers and more specifically to apparatus that is employed to sense the height of the individual pallets being fed from the pallet magazine to the loading point and automatically adjusts the height of the palletizer's stripper plate to permit the pallet with or without a slip sheet to pass thereunder.

The use of pallets on which to stack products to be shipped has long been common practice in industry. The pallets are generally made from wood of varying height and have openings which permit forklifts to extend their forks through to lift the pallet and transport it between desired locations. The product or objects to be shipped are stacked or appropriately placed on top of the pallet.

Automation in manufacturing production lines has led to the development of automatic palletizers. These machines feed pallets automatically from a stack of pallets in a pallet feed rack or magazine onto a conveyor which carries the pallets to the loading point. The dispensing of the pallets along the conveyor is a stepped and timed sequence to correspond to the availability of product or material being placed upon the pallets. The product being placed upon the pallets is put there automatically in a predetermined pattern, such as by the use of a push or pull arm, or magnetic or pneumatic pick-up heads. However, in automatic palletizers the product is normally first positioned in its desired pattern on a stationary stripper plate. Once thus placed on the stripper plate, the positioned product is appropriately transferred, such as by an extendable ram or pusher, from the stripper plate onto the adjacent pallet. The loaded pallets are automatically discharged from the palletizer and then removed, generally by a forklift, to a shipping location where the product, with or without pallets, is loaded onto the appropriate means of transportation, such as a truck or railroad car.

Where pallets are used as an intermediate support for the product that is to be repackaged or moved again prior to placement on the final shipping means, slip sheets or pieces of cardboard or other material of predetermined thickness are placed on top of the pallets. The slip sheets permit a product that will be shipped without pallets to be removed more easily from the top of the pallets without damaging either the product containers or the pallets. Slip sheets also can provide the final shipping base for products when used with specially modified forklifts and unitized loads where stretch wrapping, banding, or gluing is employed. This unitized loading technique reduces the shipping freight costs and the number of costly pallets required.

Pallets present a problem in automatic palletizers, however, because of the lack of uniformity in their height. Pallets can routinely vary in height from $4\frac{1}{2}$ inches to $5\frac{3}{4}$ inches. Where slip sheets are employed, as much as an additional $\frac{1}{4}$ inch can be added to the combined height of the pallet and slip sheet. This variation in height can cause the slip sheet to be stripped from the pallet as the pallet passes beneath the stripper plate. A greater problem however, is caused by the taller pallets which can be forced against the stationary stripper plate, causing it to flex upwardly as the pallet passes beneath. The forcing action of the pallet against the stripper plate can cause damage and excessive wear to the stripper plate, pallet, drive mechanism, or the conveyor. These and other problems are solved in the design of the apparatus comprising the present invention by employing an automatic height sensing mechanism that senses the height of the individual pallet or the slip sheeted pallet.

SUMMARY OF THE INVENTION

It is an object of the present invention to provide means to sense the height of the individual pallet, with or without a slip sheet, as the pallet is conveyed along its predetermined path of travel along the length of the automatic palletizer.

It is another object of the present invention to provide means to automatically raise the height of the stripper plate above the sensed height of the pallet sheet to permit the pallet, with or without its slip sheet, to pass thereunder without any interference.

It is a feature of the present invention that the height sensing shoes or means are pivotally mounted to the palletizer so that the height sensing means can be raised in response to the height of the pallets fed from the pallet feed magazine.

It is another feature of the present invention that a limit switch cooperative with each height sensing shoe activates a hydraulic cylinder via an electrohydraulic circuit and a programmable controller to raise the stripper plate automatically above the sensed height of the individual pallet and slip sheet.

It is still another feature of the present invention that the limit switch is deenergized automatically upon the stripper plate's having reached its desired height, thereby stopping the upward travel of the stripper plate.

It is still another feature of the present invention that a second limit switch is activated by a pallet push bar after the pallet has cleared the stripper plate to automatically lower the stripper plate to the starting position height.

It is an advantage of the present invention that the height sensing means automatically sets the height of the stripper plate above the sensed height of the individual pallet being fed, with or without its slip sheet, to eliminate the forcing action of the pallet against the stripper plate.

It is another advantage of the present invention that the height sensing means reduces the mechanical wear to the stripper plate and allows the individual slip sheet to remain on the pallet without being dislodged or without damaging the automatic palletizer.

It is still another advantage of the present invention that the stripper plate is adjustable vertically in response to the sensed pallet and slip sheet height.

These and other objects, features and advantages are provided by the apparatus comprising the present invention wherein an automatic palletizer is provided with a pallet height sensing mechanism which senses the height of the individual pallet, with or without a slip sheet, and automatically adjusts the stripper plate above the sensed height as the pallet is moved by a conveyor along a predetermined path of travel that runs the length of the automatic palletizer.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of an automatic palletizer showing a pallet feed rack, the slip sheet dispenser, the pallet stripper plate, the conveyor and the limit switch used to sense the pallet push bar to lower the height sensing means after a pallet has moved along the predetermined path of travel down the length of the conveyor;

FIG. 2 is a top plan view of the automatic palletizer with portions broken away, to show the location of the limit switches that are part of the height sensing means along the predetermined path of travel of the individual pallet;

FIG. 3 is a side elevational view of the height sensing means with portions of the automatic palletizer broken away to show the pallet height sensing means, and the adjustable stripper plate.;

FIG. 4 is a sectional view taken along the lines 4—4 of FIG. 3 showing the stripper plate and its vertical adjusting mechanism;

FIG. 5 is a partial end view looking along the direction indicated by arrows 5—5 of FIG. 3 showing one of the two hydraulic cylinders that are actuated by the limit switches of the height sensing means to raise the stripper plate above the sensed height.

DETAILED DESCRIPTION OF THE PREFERRED EMBODIMENT

Figure 6:
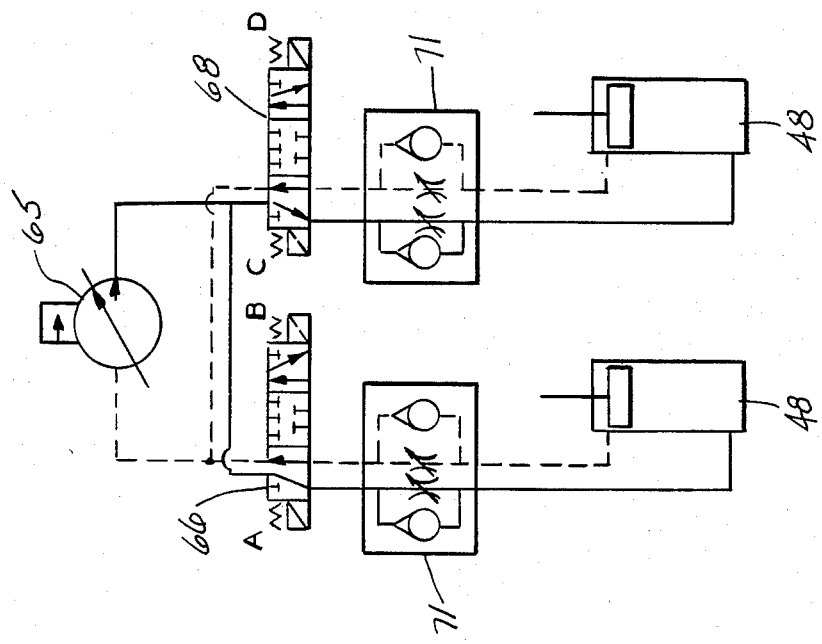
FIG. 6 is a schematic diagram of the hydraulic circuit used to raise and lower the cylinder rod of each hydraulic cylinder shown in FIG. 5.

FIGS. 1 and 2 show an automatic palletizer, indicated generally by the numeral 10. An automatic palletizer 10 similar to the one disclosed is commercially available from Currie Manufacturing Company. The palletizer 10 includes a pallet feed stack or magazine 11 within which pallets are stored vertically. The pallet feed stack 11 is a bottom-feed device so that the bottommost pallet is deposited on a floor member 13, such as a steel sheet, along which the pallets are slid as they are moved along a predetermined path of travel by a chain conveyor 17, partially seen in FIG. 1, that takes them the length of the palletizer 10.

Adjacent the pallet feed stack 11 is the slip sheet dispenser 12. Slip sheet dispenser 12 includes a slip sheet rack or magazine 24, best seen in FIG. 2, and a slip sheet track 25 along which the slip sheet dispensing mechanism 26 of FIG. 1 rides to carry a slip sheet from the slip sheet rack 24 to the slip sheet placement area 28 along the predetermined path of travel on the palletizer 10.

Once the slip sheet is placed upon the pallet in the slip sheet placement area 28, the pallet is moved forward to the pallet loading area 14 where the product to be loaded onto the pallet is positioned. A stacker, indicated generally by the numeral 15, which is controlled by a programmable controller, indicated generally by the numeral 33, can be used to create stacks of product containers, such as drums, a predetermined number high so they may be moved to the pallet loading area. A ram or product arm 19 pushes or pulls the stacked containers from the stacker conveyor 27, onto the stripper plate 20.

The stripper plate 20 provides a location on which is placed the drums or other containers in a predetermined pattern prior to the containers being pushed singly or in stacks on top of the pallet. The programmable controller 33 controls the pattern in which the product containers are placed on the stripper plate 20. The stripper plate 20 is moveable vertically to adjust to the combined height of the pallet and the slip sheet, or to the height of the pallets only, since the pallets are not uniform in their height and can vary, such as from 4½ inches to 5¾ inches in height. This vertical adjustability, as will be described in detail hereafter, permits the stripper plate to be positioned at a sufficient height to let a pallet, with or without a slip sheet on top, pass under without any appreciable interference.

As best seen in FIGS. 1 and 2 the automatic palletizer has a frame 16 which supports the palletizer feed stack 11, chain conveyor 17, and the other components of the automatic palletizer 10. The frame 16 also supports the opposing tracks 18, along which the pallet push bars 29, seen in FIG. 1, travel. The pallet push bars 29 are connected to a chain conveyor 17 that is part of the automatic palletizer 10 and which moves in a predetermined path of travel down the length of the palletizer frame 16. The chain conveyor 17 is comprised of two opposing continuous lengths of chain, each of which is appropriately connected to the pallet push bars 29. The pallet push bars 29 are spaced equidistantly apart along the continuous lengths of chain. This spacing is deliberate so the timed travel of a pallet along the predetermined path of travel down the length of the palletizer frame 16 may utilize the pallet push bars 29 to activate limit switches to signal the programmable controller 33 that certain functions should be initiated or terminated, depending upon the location of the push bars 29 and the pallet being conveyed.

Limit switches 21 and 22, seen in FIG. 1, are positioned along the lower run of the chain conveyor 17 so they are activated by the pallet push bar 29 as it passes. Limit switch 21, once made, signals the programmable controller that a pallet is in position along the predetermined path of travel to receive a slip sheet from the slip sheet dispensing mechanism 26. Other sensors, feeding into the programmable controller 33, automatically control the placement of the slip sheet upon the pallet. As the conveyor 17 is reactivated, the pallet push bar 29 is carried rearwardly toward limit switch 22. Once made, limit switch 22 signals the programmable controller 33 to drop the stripper plate 20 to its fully lowered position. Limit switches 23, both of which are seen in FIG. 2 and one of which is shown in FIG. 3, signal the programmable controller 33 to actuate the hydraulic circuit shown in FIG. 6 to cause the stripper plate 20 to be raised in a manner that will be described hereinafter.

Pallet height sensing means, indicated generally by the numeral 30, is shown in FIG. 3 wherein one height sensing shoe 31 is shown pivotally mounted to a bracket plate 32 that is fastened to the palletizer 10. Each height sensing shoe 31 has a downwardly sloped portion 34 on the shoe's pallet receiving end. The shoe 31 is pivotally connected to the bracket plate 32 by pivot links 35 and 36. Pivot links 35 and 36 pivot about stub shafts 38 and 39, respectively in response to the movement of a pallet 49 and a pallet slip sheet 50 thereagainst. The pivotally upward movement of shoe 31 is illustrated in FIG. 3 wherein the shoe 31 is seen in its lower position in solid lines and is seen in its raised position in the dotted lines. For the sake of simplicity and clarity, limit switch 23 is shown only in the position that corresponds to the lower position of the shoe 31.

Stripper plate 20, as seen in FIGS. 3 and 4, in its fully lowered position rests upon a frame 40. As best seen in FIG. 4, stripper plate 20 is a single plate that has two end member portions 41 which rest on top of the frame 40. Between the end member portions 41 is a machined out area 43, best seen in FIGS. 2 and 4. A side extension 42 is appropriately fastened to one of the stripper plate end portions 41 on the side adjacent the stacker conveyor 27 to form a transition therebetween. A pair of angle plates 44 underlie end portions 41 and are appropriately connected to palletizer side frame plates 45 which are fastened, such as by bolting or welding, to frame 40.

The stripper plate height adjusting means, indicated by the numeral 46 in FIG. 3, employs a pair of hydraulic cylinders 48, only one of which is shown, to raise the stripper plate 20 in response to the sensed height of the pallet 49 and slip sheet 50. The hydraulic cylinder 48 is appropriately anchored to frame member 51 so that the rod member 52 moves generally vertically upwardly and is appropriately connected to connecting links 54. Connecting links 54 are appropriately connected to a shaft 55, such as by key ways, so that when the double acting hydraulic cylinder 48 contracts its rod member 52, the shaft 55 rotates in the direction indicated by arrow 56 of FIG. 5. This, in turn, causes lifting member 58, with its roller 59 (seen in FIG. 4) to be elevated through the translation of the rotational movement through angle bracket 60 that is welded to shaft 55. Roller 59 presses upwardly against block 61 to lift up stripper plate 20 to the desired height. The lifting members 58, with its rollers 59, are located on both sides of the stripper plate 20, three per side. The three blocks 61 along each side (briefly refer to FIG. 3) are retained in place by an appropriate retaining member, such as an L-shaped bracket 62, seen in FIG. 4.

When thus raised, the stripper plate 20 moves upwardly and carries with it member 64 of FIG. 3. The arm of limit switch 23 is pivotally fastened to one end of member 64 so that when the stripper plate 20 and the member 64 are raised to a sufficient height so that the pallet 49 and the slip sheet 50 pass thereunder, the limit switch 23 is no longer in contact with the height sensing shoe 31. When this occurs, the limit switch is deactivated and the programmable controller 33 receives a signal that the pallet 49 and slip sheet 50 will pass under the stripper plate 20. The programmable controller 33 in turn deactivates the hydraulic circuit shown in FIG. 6 to stop the flow of hydraulic fluid within the hydraulic cylinders 48 to stop raising the stripper plate 20.

In operation a pallet 49 with a slip sheet 50 placed on top is slid along the predetermined path of travel of the automatic palletizer 10 by the chain conveyor 17. As the pallet 49 and slip sheet 50 engage the height sensing shoes 31, the height sensing shoes 31 are pivoted rearwardly and upwardly about the stub shafts 38 and 39 of pivot links 35 and 36. This upward movement of the height sensing shoes 31 makes the limit switches 23, which in turn signal the programmable controller 33 to activate the hydraulic circuit depicted in FIG. 6.

The hydraulic pump and reservoir 65 provides hydraulic fluid to the double solenoid directional valves 66 and 68. The programmable controller 33 causes the solenoids A and C to open the flow path to permit the hydraulic fluid to flow out of the hydraulic cylinders 48 back into the reservoir 65. This permits the rod member 52 to retract, causing the shaft 55 to be pivoted so that the lifting members 58 and rollers 59 raise the stripper plate 20. The flow through the circuit to the hydraulic cylinders is maintained at a uniform flow rate by the use of flow control valves 70 and 71.

This elevation of the stripper plate 20 also raises the member 64 to which the limit switch 23 is attached. When the stripper plate 20 has been sufficiently raised so that limit switch 23 is no longer in contact with the top of height sensing shoe 31, the limit switch 23 is deenergized. This signals the programmable controller 33 to deenergize solenoids A and C of directional valves 66 and 68 to permit the self-positioning spools within the directional valves to reposition themselves in a neutral position so that the stripper plate 20 remains at the particular height where the limit switches 23 have been deenergized.

When the pallet 49 and the slip sheet 50 have passed beneath the stripper plate 20 to the pallet loading area 14, the chain conveyor 17 is stopped and product containers, such as drums, are placed on the stripper plate 20 in the desired pattern by the product arm 19 as they are received from the stacker 15 and the stacker conveyor 27. When the desired number of product containers have been placed on the stripper plate 20, the programmable controller 33 causes a ram 69 in FIG. 3 to move forward, forcing the product containers from the stripper plate 20 onto the pallet 49 and the slip sheet 50. The placing of additional containers on the stripper plate 20 is repeated by the product arm or ram 19 and the off-loading onto the pallet 49 and slip sheet 50 a desired number of times until a full pallet load is obtained. At this time the programmable controller 33 initiates the movement of the chain conveyor 17 to move the pallet with the pallet push bar 29 from the palletizer to a full pallet conveyor (not shown) where the loaded pallet 49 is removed by a forklift.

The second pallet push bar 29, seen in FIG. 1 is then completing its continuous path of travel beneath the palletizer 10 and passes the limit switch 22. This limit switch is energized and signals the programmable controller 33 to lower the height sensing shoe 31 to its fully lowered position. This is done by sending a signal to the solenoids B and D in directional valves 66 and 68, thereby moving the spools within the valves 66 and 68 to permit hydraulic fluid to flow into the hydraulic cylinders 48 to raise rod ends 52 to their raised position. As the bottom pallet push bar 29 comes to the top of the chain conveyor 17 another pallet 49 is in position to be engaged by the front of the pallet push bar 29 and removed from the bottom of pallet feed magazine 11.

In this manner, the stripper plate 20 through the height sensing means 30 is raised to the appropriate height in response to the sensed height of the pallet 49 and the slip sheet 50 to permit the pallet 49 and the slip sheet 50 to pass thereunder without appreciably interfering with the stripper plate 20 or being forced thereagainst.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts which will occur to one of skill in the art upon the reading of the disclosure. For example, other means to elevate the stripper plate 20 than hydraulic cylinders 48 could be employed. Similarly, the height sensing mechanism, although described above in a palletizer, could equally well be employed in a depalletizer or any other conveyor where pallets are employed.

What is claimed is:

1. In a conveyor for moving pallets along a predetermined path of travel, comprising in combination:
   (a) sensing means positioned along the predetermined path of travel to sense the height of individual pallets as each pallet travels along the predetermined path of travel;
   (b) signal means cooperative with the sensing means and activated by a pallet being sensed by the sensing means;
   (c) control means cooperative with the signal means to receive a signal from the signal means indicating the height of the individual pallet;
   (d) product receiving means overlying the predetermined path of travel and moveable upwardly in at least a generally vertical direction to permit individual pallets to pass thereunder along the predetermined path of travel without any interference; and
   (e) elevation means cooperative with and responsive to the control means to move the product receiving means in the generally vertical direction.

2. The apparatus according to claim 1 wherein the elevation means further comprises at least one hydraulic cylinder.

3. The apparatus according to claim 2 wherein the signal means further comprises at least one limit switch.

4. The apparatus according to claim 2 wherein the sensing means further is moveable from a first lower position wherein the signal means is not activated to at least a second raised position wherein the signal means is activated.

5. The apparatus according to claim 4 wherein the sensing means is further pivotally moveable between the first lower position and the at least second raised position.

6. The apparatus according to claim 5 wherein the sensing means further comprises at least one elongate sensing shoe having a downwardly sloped first portion which initially contacts a pallet as the pallet moves along its predetermined path of travel.

7. The apparatus according to claim 1 wherein the signal means is further connected to and moveable in the generally vertical direction with the product receiving means.

8. The apparatus according to claim 7 wherein the control means is further a programmable controller that is communicatively connected with the elevation means.

9. The apparatus according to claim 8 wherein the programmable controller selectively signals the elevation means to raise or lower the product receiving means.

10. The apparatus according to claim 9 wherein the conveyor is connected to an automatic palletizer.

11. The apparatus according to claim 9 wherein the product receiving means is a stripper plate.

12. The apparatus according to claim 11 wherein the stripper plate is cooperative with a product conveyor that places product in a predetermined pattern on the stripper plate.

13. The apparatus according to claim 12 wherein the stripper plate is cooperative with a product ram to move the product from the stripper plate onto the pallet.

14. The apparatus according to claim 1 wherein the conveyor is further cooperative with a slip sheet dispenser to position a slip sheet on top of a pallet as the pallet moves along the predetermined path of travel prior to reaching the sensing means.

15. The apparatus according to claim 14 wherein the sensing means further senses the combined height of the individual pallet and the slip sheet.

16. The apparatus according to claim 13 wherein the conveyor is further cooperative with a slip sheet dispenser to position a slip sheet on top of a pallet as the pallet moves along the predetermined path of travel prior to reaching the sensing means.

17. The apparatus according to claim 1 wherein the sensing means is further moveable in response to the height of the individual pallet.

* * * * *